United States Patent
Davis et al.

(10) Patent No.: US 11,946,383 B2
(45) Date of Patent: *Apr. 2, 2024

(54) SEAL OIL SYSTEMS

(71) Applicant: RTX Corporation, Farmington, CT (US)

(72) Inventors: Todd A. Davis, Tolland, CT (US); Christopher M. Valva, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,412

(22) Filed: Jun. 28, 2022

(65) Prior Publication Data
US 2022/0325633 A1    Oct. 13, 2022

Related U.S. Application Data

(63) Continuation of application No. 16/215,470, filed on Dec. 10, 2018, now Pat. No. 11,401,833.

(51) Int. Cl.
| | |
|---|---|
| *F01D 25/18* | (2006.01) |
| *F01D 25/20* | (2006.01) |
| *F16C 33/66* | (2006.01) |
| *F16C 33/76* | (2006.01) |

(52) U.S. Cl.
CPC .......... *F01D 25/186* (2013.01); *F01D 25/20* (2013.01); *F16C 33/6637* (2013.01); *F16C 33/76* (2013.01); *F05D 2260/98* (2013.01); *F16C 2360/23* (2013.01)

(58) Field of Classification Search
CPC ...... F01D 25/183; F01D 25/286; F01D 25/20; F01D 21/14; F01D 11/003; F16C 33/6637; F16C 33/76; F16C 2360/23; F05D 2260/98; F05D 2240/50; F05D 2240/55; F05D 2300/224; F01M 11/067; F16J 15/3404; F16N 2210/09; F16N 2210/14; F02C 7/06

See application file for complete search history.

(56) References Cited

U.S. PATENT DOCUMENTS

| | | | |
|---|---|---|---|
| 3,486,582 A | 12/1969 | Carter et al. | |
| 5,107,676 A | 4/1992 | Hadaway et al. | |
| 5,174,584 A * | 12/1992 | Lahrman | F01D 11/003 277/400 |
| 8,893,469 B2 | 11/2014 | DiBenedetto et al. | |
| 9,739,173 B2 | 8/2017 | Valva et al. | |
| 9,897,005 B2 | 2/2018 | Chilton et al. | |
| 9,976,444 B2 | 5/2018 | NguyenLoc et al. | |
| 10,174,629 B1 | 1/2019 | Valva et al. | |

(Continued)

*Primary Examiner* — Loren C Edwards
(74) *Attorney, Agent, or Firm* — Carlson, Gaskey & Olds, P.C.

(57) ABSTRACT

A gas turbine engine includes a first bearing compartment and a seal assembly within the first bearing compartment that includes a rotatable seal seat, a gutter radially outward of the seal seat and fixed against rotation. The gutter includes a channel on its radially inner face. A second bearing compartment is also included. A scavenge pump is in communication with a first supply line configured to supply the first bearing compartment and a second supply line configured to supply the second bearing compartment. The gutter is in communication with the scavenge pump through a gutter scavenge line.

19 Claims, 6 Drawing Sheets

(56) References Cited

U.S. PATENT DOCUMENTS

| | | | |
|---|---|---|---|
| 2003/0099538 A1* | 5/2003 | Liu | F01D 25/183 |
| | | | 415/111 |
| 2006/0054406 A1 | 3/2006 | Delaloye | |
| 2008/0006483 A1 | 1/2008 | Pamin et al. | |
| 2010/0294371 A1 | 11/2010 | Parin et al. | |
| 2012/0248707 A1* | 10/2012 | Dixon | F01D 11/04 |
| | | | 277/412 |
| 2014/0064908 A1* | 3/2014 | Grillo | F01M 11/067 |
| | | | 415/146 |
| 2017/0051823 A1 | 2/2017 | Pikovsky et al. | |
| 2017/0234222 A1 | 8/2017 | Schwendenmann | |
| 2017/0356306 A1 | 12/2017 | Lao et al. | |
| 2018/0291960 A1* | 10/2018 | Anglin | F16J 15/3404 |

\* cited by examiner

SEAL OIL SYSTEMS

CROSS-REFERENCED TO RELATED APPLICATION

This application is a continuation of U.S. application Ser. No. 16/215,470, which was filed on Dec. 10, 2018.

STATEMENT REGARDING FEDERALLY SPONSORED RESEARCH OR DEVELOPMENT

This invention was made with Government support awarded by the United States. The Government has certain rights in this invention.

BACKGROUND

This disclosure relates to gas turbine engines, and more particularly to bearing compartments in gas turbine engines.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Various seals may be utilized near the rotating shaft of the engine, such as to contain oil within oil fed areas of the engine including bearing compartments. The oil fed to these compartments may be used to cool the seals.

SUMMARY

A gas turbine engine according to an example of the present disclosure includes a first bearing compartment and a seal assembly within the first bearing compartment. The seal assembly includes a rotatable seal seat, a gutter radially outward of the seal seat and fixed against rotation. The gutter includes a channel on its radially inner face. A second bearing compartment is also included. A scavenge pump is in communication with a first supply line configured to supply the first bearing compartment and a second supply line configured to supply the second bearing compartment. The gutter is in communication with the scavenge pump through a gutter scavenge line.

In a further example according to any of the foregoing examples, the channel is V-shaped and fully annular.

In a further example according to any of the foregoing examples, the channel feeds the gutter scavenge line through an air/oil separation ramp, and the gutter scavenge line is attached to the gutter near the air/oil separation ramp.

In a further example according to any of the foregoing examples, the second supply line is also configured to supply the first bearing compartment at a bearing section including a bearing, and the first supply line is configured to supply the first bearing compartment at a seal section including the seal assembly.

In a further example according to any of the foregoing examples, closing a valve stops oil supply to the bearing section.

In a further example according to any of the foregoing examples, the gas turbine engine includes a third bearing compartment. The second supply line is configured to supply oil to the third bearing compartment.

In a further example according to any of the foregoing examples, the second bearing compartment and the third bearing compartment do not include a gutter.

In a further example according to any of the foregoing examples, a gas turbine engine includes a first scavenge line from the bearing section to the scavenge pump, a second scavenge line from the second bearing compartment to the scavenge pump, and a third scavenge line from the third bearing compartment to the scavenge pump.

In a further example according to any of the foregoing examples, the second bearing compartment does not include a gutter.

In a further example according to any of the foregoing examples, the first supply line is upstream of a valve relative to the flow of supply from the pump.

In a further example according to any of the foregoing examples, a controller configured to close a valve in response to the negative gravity event.

In a further example according to any of the foregoing examples, the seal assembly includes a fixed seal, and the seal seat is rotatable against the fixed seal.

In a further example according to any of the foregoing examples, the fixed seal is a carbon face seal.

In a further example according to any of the foregoing examples, the seal seat is metallic.

In a further example according to any of the foregoing examples, the seal seat is a wet seal.

In a further example according to any of the foregoing examples, a gas turbine engine includes a carbon face seal that abuts the seal seat.

In a further example according to any of the foregoing examples, the dry port event is a negative gravity event.

In a further example according to any of the foregoing examples, a gas turbine engine includes a first scavenge line from the first bearing compartment to the scavenge pump and a second scavenge line from the second bearing compartment to the scavenge pump.

In a further example according to any of the foregoing examples, a gas turbine engine includes a third bearing compartment. The second supply line is configured to supply oil to the third bearing compartment.

In a further example according to any of the foregoing examples, a gas turbine engine includes a first scavenge line from the first bearing compartment to the scavenge pump, a second scavenge line from the second bearing compartment to the scavenge pump, and a third scavenge line from the third bearing compartment to the scavenge pump. The second bearing compartment and the third bearing compartment do not include a gutter.

These and other features may be best understood from the following drawings and specification.

DETAILED DESCRIPTION

Figure 1:
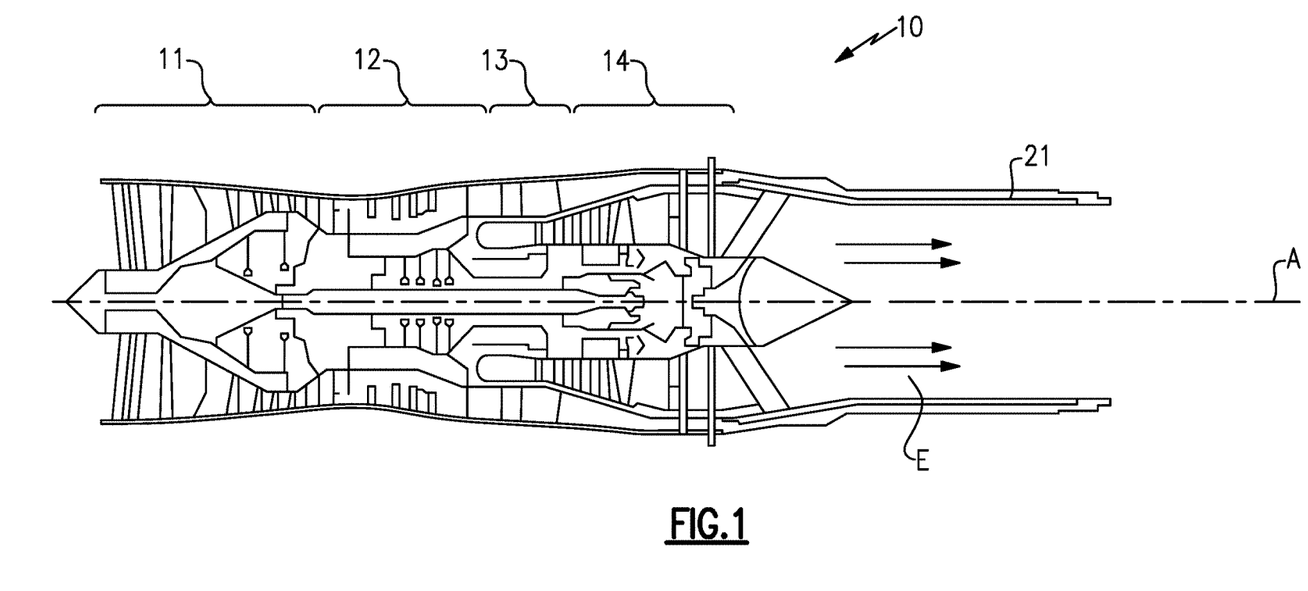
FIG. 1 schematically illustrates a gas turbine engine.

Referring to FIG. 1, a gas turbine engine 10 includes a fan section 11, a compressor section 12, a combustor section 13, and a turbine section 14. Air entering into the fan section 11 is initially compressed and fed to the compressor section 12. In the compressor section 12, the incoming air from the fan section 11 is further compressed and communicated to the combustor section 13. In the combustor section 13, the compressed air is mixed with gas and ignited to generate a hot exhaust stream E. The hot exhaust stream E is expanded through the turbine section 14 to drive the fan section 11 and the compressor section 12. The exhaust gasses E flow from the turbine section 14 through an exhaust liner assembly 21.

Figure 2:
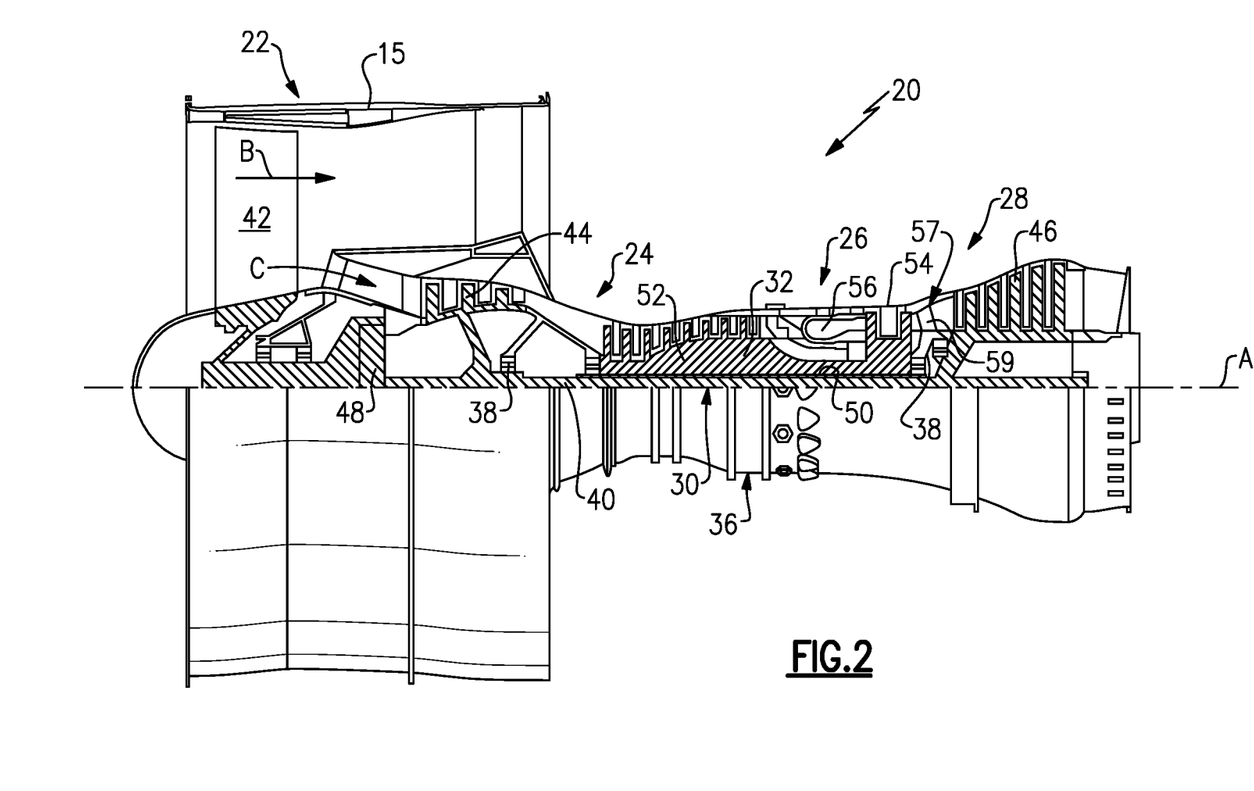
FIG. 2 schematically illustrates a second gas turbine engine.

FIG. 2 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 3:
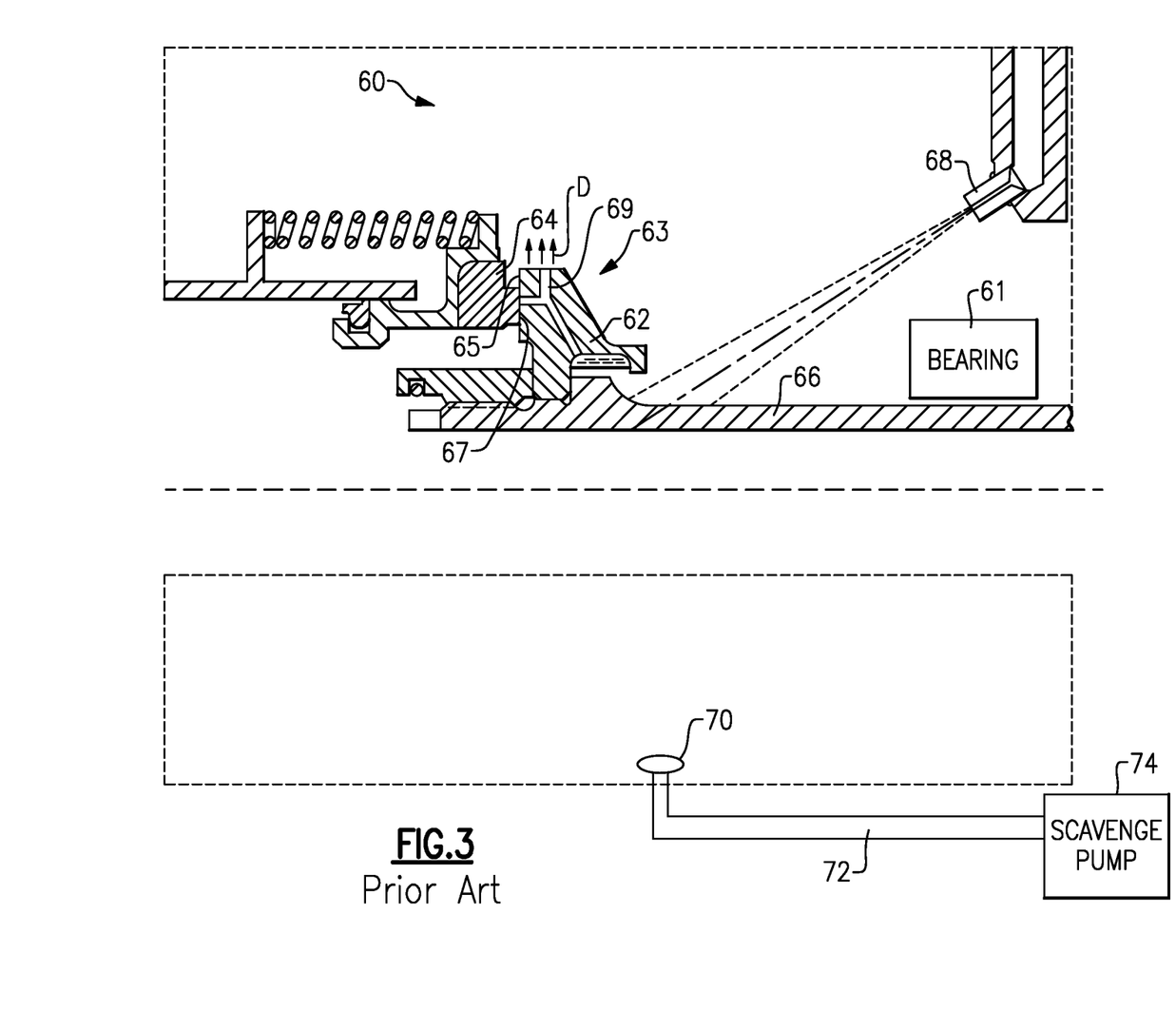
FIG. 3 schematically illustrates a prior art bearing compartment of either of the gas turbine engines shown in FIGS. 1 and 2.

FIG. 3 schematically illustrates an example bearing compartment 60 of a gas turbine engine 10/20 for housing a bearing 61. The bearing 61 may be any bearing in a gas turbine engine, including gas turbine engines 10/20, as examples only, any of the bearings 38 shown in FIG. 2. The example bearing compartment 60 is oil fed, and a seal assembly 63 may be provided to seal other areas of the gas turbine engine 10/20 from the oil directed to the bearing compartment 60.

The example seal assembly 63 includes a seal seat 62 fixed to and rotatable with a shaft 66. The seal seat 62 rotates against a static seal 64, such that a face 65 of the seal seat 62 contacts a face 67 of the seal 64. The friction between the faces 65, 67 from this relative rotation generates heat, and oil may be directed toward the seal assembly 63 for cooling. Oil may be directed to the seal assembly 63 through nozzles 68 or other known methods. Although the structure shown in FIG. 3 is prior art, Applicant has identified various potential problems with the arrangement.

The example seal 64 is a carbon seal, and the example seal seat 62 is metallic. The example seal seat 62 is a "wet seal" such that oil passes through the seal seat 62 to the interface of faces 65,67 so that the oil that flows through the seal seat 62 cools the seal seat 62, but then lubricates the interface to further reduce heat generation. Other seal assemblies, including "dry seals" (oil does not reach the interface) and seals of other materials would benefit from this disclosure.

As the seal seat 62 rotates with the shaft 66, the cooling oil has a tendency to sling off the seal seat 62 radially outward in the direction D as shown, including through a radially extending egress 69 in some examples. In normal operation, the oil delivered to the seal seat 62 exits radially and travels down to the scavenge port 70 at the bottom of the bearing compartment 60, by gravity, to be collected by the scavenge line 72 and fed back to the scavenge pump 74 outside the bearing compartment 60.

However, sometimes the gas turbine engine 10/20 may be in negative gravity operation, e.g. when gravity is oriented upwards with respect to the normal orientation of gas turbine engine 10/20, such as during an aggressive aircraft maneuver. In negative gravity operation, the oil in bearing compartment 60 will not migrate directly to the scavenge port 70 and should be suspended, in air, within the bearing compartment 60. This oil is then not available for cooling and/or lubrication, until the maneuver or other negative gravity condition is completed.

While negative gravity is one example dry port condition, other example dry port conditions may include extreme attitude, roll conditions, combinations thereof, or other maneuvers in which oil is pushed away from the scavenge port 70. While negative gravity events are disclosed as examples in this disclosure, other dry port conditions would also benefit from this disclosure.

Figure 4:
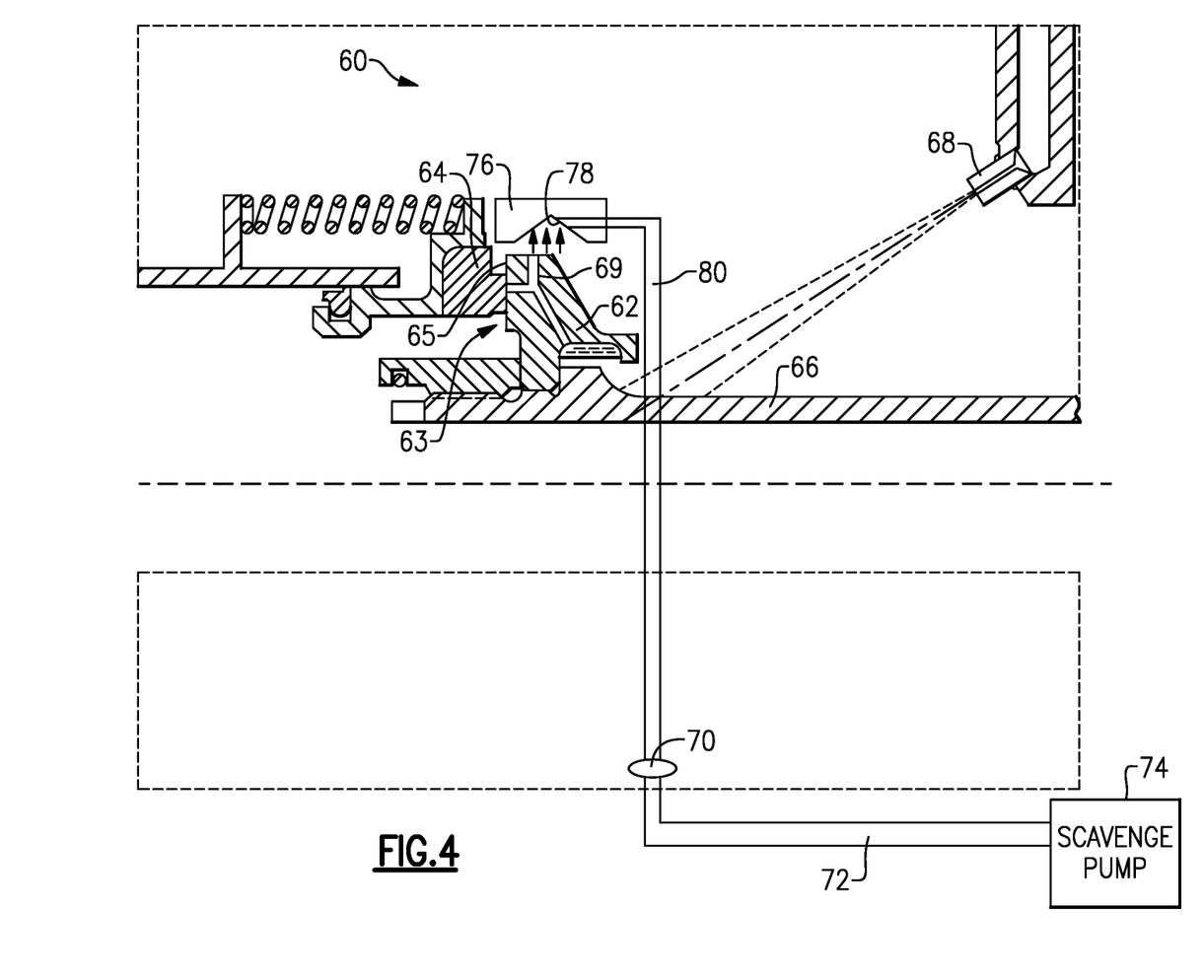
FIG. 4 schematically illustrates a bearing compartment.

As illustrated in FIG. 4, a gutter 76 may be provided radially outward of the seal assembly 63 to collect the oil flung radially outward by the seal seat 62. The example gutter 76 includes a channel 78 on its inner diameter for collecting the oil, and oil collected in the channel 78 is communicated out of the channel 78 to a gutter scavenge line 80 that feeds the scavenge line 72 through the port 70. Alternatively, the gutter scavenge line 80 may feed the scavenge line 72 or scavenge pump 74 through a different port. The example gutter 76 is fixed against rotation.

In some examples, the channel 78 is V-shaped in cross section as shown. The v-shape helps direct the oil radially outboard and collect and direct it to a ramp (discussed below) for improved air removal and scavenging.

Figure 5A:
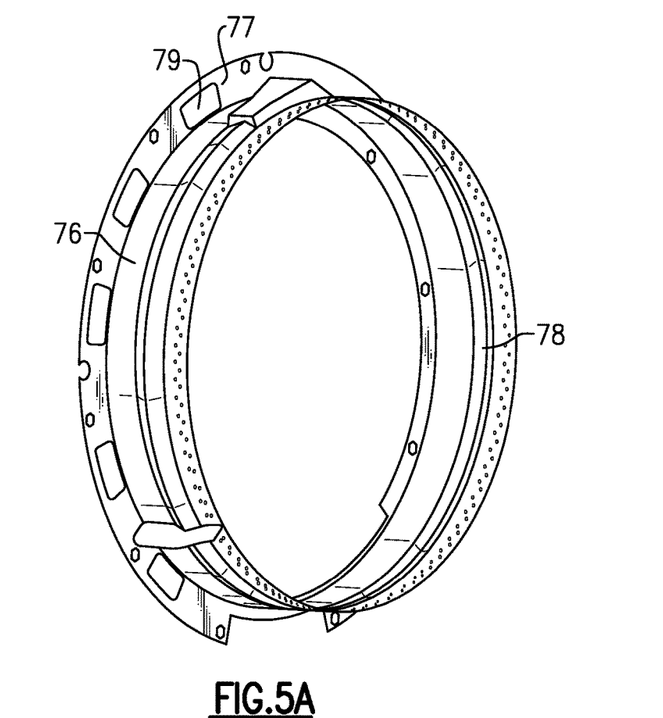
FIG. 5A illustrates an example gutter of the bearing compartment of FIG. 4.

FIG. 5A illustrates an isometric view of the example gutter 76. The example gutter 76 is a fully annular component, and the channel 78 on the inner diameter of the gutter 76 is also fully annular. A radially outwardly extending flange 77 may be provided for fixing the gutter 76 to a stationary component in the gas turbine engine 10/20. The flange 77 may include one or more openings 79 for receiving fasteners (not shown) for fixation of the gutter 76, as it is a stationary component.

Figure 5B:
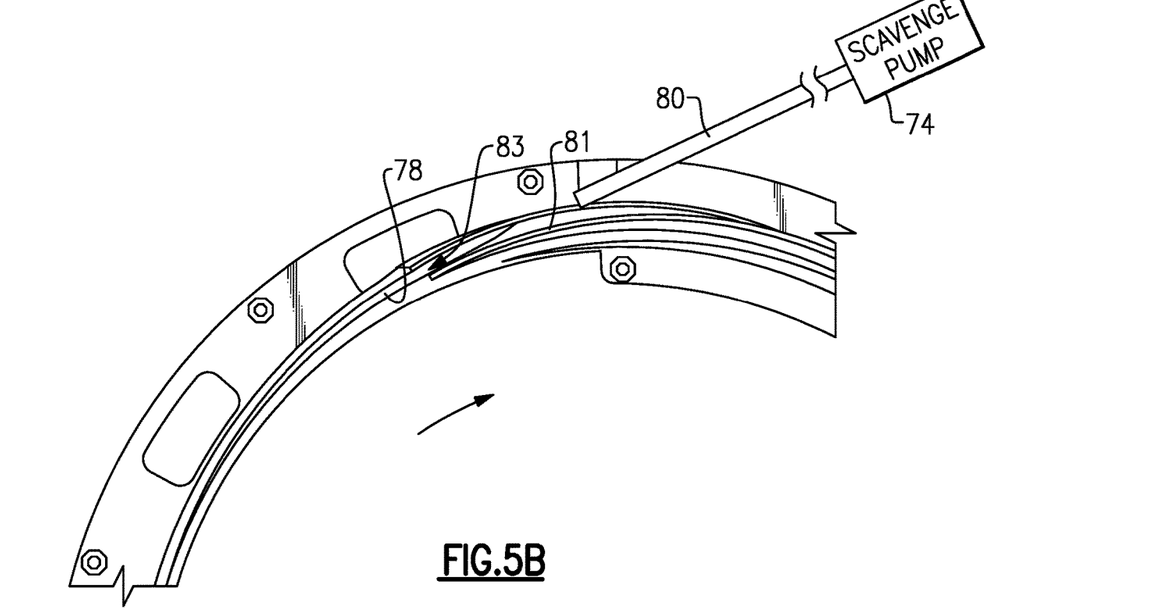
FIG. 5B illustrates an enlarged view of a portion of the gutter shown in FIG. 5A.

FIG. 5B illustrates an enlarged view of a portion of the example gutter 76. An air/oil separator ramp 81 may be provided. In this Figure, the seal seat 62 (not shown) rotates clockwise. The ramp 81 includes an inlet opening 83 in the inner diameter of the gutter 76. In this example, with the seal seat 62 rotating clockwise, the ramp 81 extends circumferentially clockwise as it extends radially outward. The rotating seal seat 62 slings an oil and air mixture radially outward. Since the oil has a greater mass than the air, the oil stays more outboard than air. The oil is received in the channel 78, which feeds the ramp 81 for the oil to exit the gutter 76. Shown schematically, the gutter scavenge line 80 may be attached to the gutter 76 near the ramp 81 to receive the oil exiting the gutter 76 through the ramp 81 and feed it to the scavenge pump 74. The air of the air and oil mixture stays inboard of the gutter 76.

The gutter 76 continues to feed the scavenge pump 74 during a negative gravity event or other dry port events, as the gutter 76 does not rely on gravity to supply the scavenge line 72. Using the gutter 76 to capture the oil and send oil directly to the scavenge pump 74 (FIG. 4) could reduce the quantity of available oil in the bearing compartment 60 during the negative gravity event. If the pump 74 also supplies oil to other areas of the engine that do not feed their respective scavenge lines during negative gravity events, the pump may receive a reduced quantity of oil through those scavenge lines, resulting in reduced oil pressure and reduced quantity of oil available to components, such as seal assembly 63, that are feeding their scavenge lines. An example pump system that avoids these situations is therefore described below.

Figure 6:
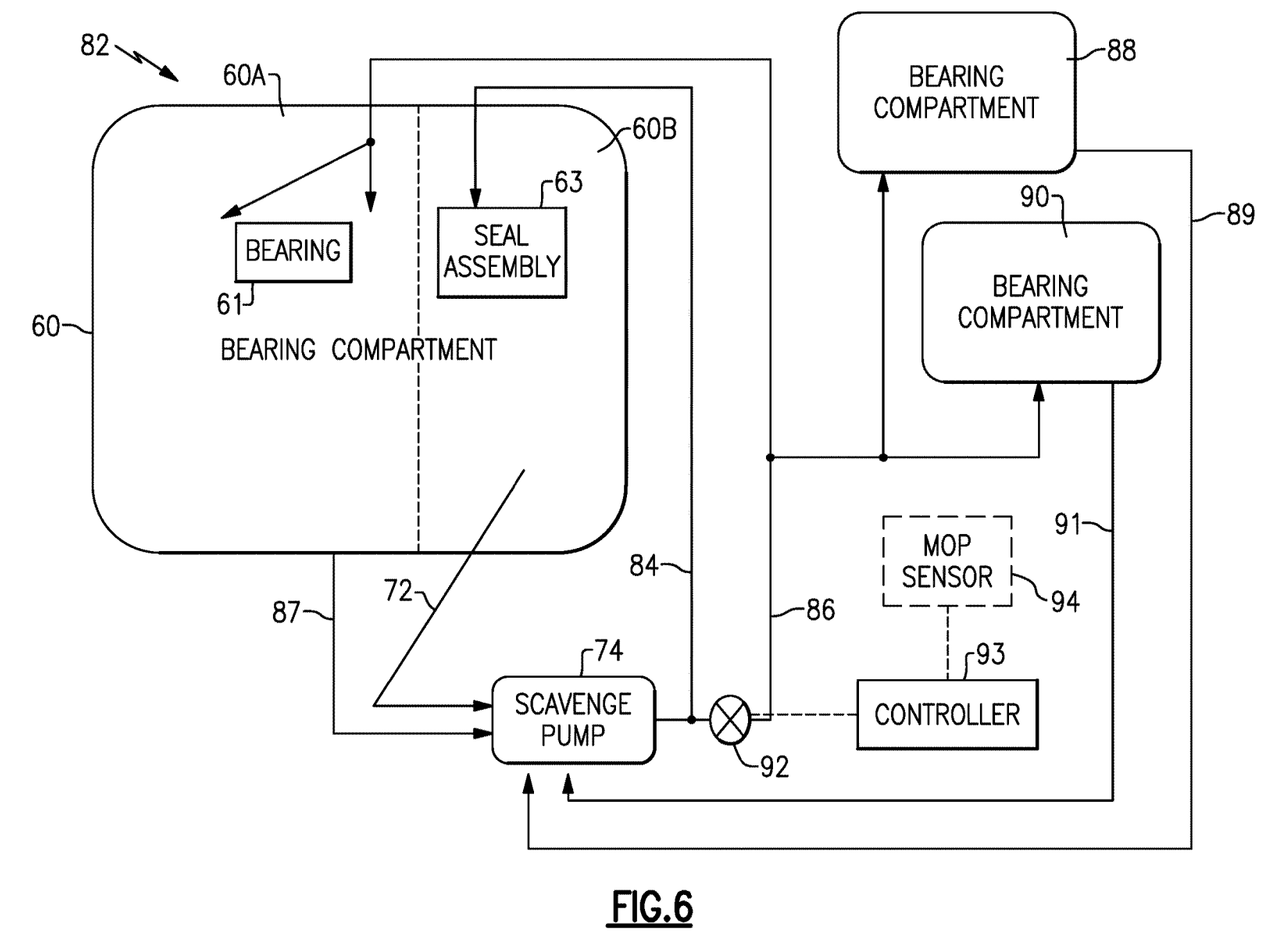
FIG. 6 schematically illustrates an example pump system.

FIG. 6 schematically illustrates an example pump system 82. The scavenge pump 74 is in communication with bearing compartment 60 and additional bearing compartments 88, 90. The bearing compartment 60 includes a portion 60A having bearing 61 and a portion 60B having seal assembly 63. The example system 82 includes a dedicated supply line 84 to the portion 60B, as well as supply lines 86 to the portion 60A and compartments 88, 90. Although a schematic arrangement is shown, various fluid line arrangements may be utilized. The example bearing compartments 60, 88, and 90 are separate bearing compartments.

A scavenge line 89 runs from bearing compartment 88 back to scavenge pump 74, and a scavenge line 91 runs from bearing compartment 90 back to scavenge pump 74, for returning scavenge oil back to the pump 74. The scavenge line 72 runs from portion 60B back to the pump 74, and a scavenge line 87 runs from the portion 60A back to the pump 74. In the example, the bearing compartments 88, 90 and the portion 60A do not include a gutter 76 and therefore, during negative gravity or other dry port events, provide less scavenge oil back to the scavenge pump 74 through scavenge lines 87, 89, 91 than the portion 60B provides through scavenge line 72.

A valve 92 is provided to selectively close supply to the supply lines 86 during certain events, such as negative gravity events or other dry port events in some examples. The valve 92 may be in communication with a controller 93 that controls the valve 92 based on various engine parameters. The valve 92 may be electric, pneumatic, or hydraulic valve in some examples. In some examples, the controller 93 is the Full Authority Digital Engine Control (FADEC) and may be in communication with a Main Oil Pressure (MOP) sensor 94 that reads main oil pressure of the engine 10/20. The valve 92 may be controlled in response to the main oil pressure reading, such that the valve 92 is closed if main oil pressure drops below a certain value in some examples. In some examples, during negative gravity or other dry port events, the valve 92 closes to shut off flow through the supply lines 86, while allowing flow to the dedicated supply line 84 and/or other select components. In the example, the dedicated supply line 84 is upstream of the valve 92 relative to the supply oil flow path from the scavenge pump 74.

In the example shown, the seal assembly 63 is one of the select components that receives oil when the valve 92 is closed, because of dedicated supply line 84. Because of gutter 76 (not shown) of seal assembly 63, the scavenge line 72 stays fed with oil during negative or reduced gravity or other dry port events. Therefore more oil may need to be fed to bearing compartment 60 during that time. Further, because the example compartments 88, 90 and portion 60A do not include a gutter 76, they may not feed their respective scavenge lines 87, 89, 91 as much as scavenge line 72 is fed during a negative gravity event or other dry port event. The valve 92 closes to shut off flow through the supply lines 86, but the system 82 is still arranged to provide oil through the dedicated supply line 84 to the seal assembly 63.

Continuous flow through a selected portion of the example system 82 is therefore achieved, flowing from the pump 74, though the dedicated supply line 84, to the seal assembly 63, through the scavenge line 72, and back to the pump 74, even in a negative gravity event or other dry port event. The system 82 is also prevented from running out of oil, preventing bearing compartments 88, 90 and portion 60A from being fed oil during events in which they are not providing oil back into their respective scavenge lines 87, 89, 91. The system therefore prevents low oil pressure situations in which components are starved of oil for cooling or lubrication. The system 82 allows scavenge oil to be collected and preferentially routed to critical components to ensure the configuration meet the overall gas turbine engine requirements during negative gravity events or other dry port events.

Although the different embodiments are illustrated as having specific components, the embodiments of this disclosure are not limited to those particular combinations. It is possible to use some of the components or features from any of the embodiments in combination with features or components from any of the other embodiments.

It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
   a first bearing compartment;
   a seal assembly within the first bearing compartment, comprising:
      a rotatable seal seat; and
      a gutter radially outward of the seal seat and fixed against rotation, the gutter including a channel on a radially inner face of the gutter;
   a second bearing compartment; and
   a scavenge pump in communication with a first supply line configured to supply the first bearing compartment and a second supply line configured to supply the second bearing compartment,
   wherein the gutter is in communication with the scavenge pump through a gutter scavenge line, the channel feeds the gutter scavenge line through an air/oil separation ramp, the gutter scavenge line is attached to the gutter near the air/oil separation ramp, and the gutter includes a radially outwardly extending flange for attachment of the cutter to a stationary component of the engine.

2. The gas turbine engine as recited in claim 1, wherein the channel is V-shaped and fully annular.

3. The gas turbine engine as recited in claim 1, wherein the second supply line is also configured to supply the first bearing compartment at a bearing section including a bearing, and the first supply line is configured to supply the first bearing compartment at a seal section including the seal assembly.

4. The gas turbine engine as recited in claim 3, further comprising a valve, wherein closing the valve stops oil supply to the bearing section.

5. The gas turbine engine as recited in claim 4, comprising:
   a third bearing compartment, wherein the second supply line is configured to supply oil to the third bearing compartment.

6. The gas turbine engine as recited in claim 5, wherein the second bearing compartment and the third bearing compartment do not include a gutter.

7. The gas turbine engine as recited in claim 1, wherein the second bearing compartment does not include a gutter.

8. The gas turbine engine as recited in claim 1, further comprising a valve, wherein the first supply line is upstream of the valve relative to a flow of supply from the scavenge pump.

9. The gas turbine engine as recited in claim 1, comprising:
   a valve between the scavenge pump and the second supply line; and
   a controller configured to close the valve in response to a negative gravity event.

10. The gas turbine engine as recited in claim 1, wherein the seal assembly includes a fixed seal, and the seal seat is rotatable against the fixed seal.

11. The gas turbine engine as recited in claim 10, wherein the fixed seal is a carbon face seal.

12. The gas turbine engine as recited in claim 11, wherein the seal seat is metallic.

13. The gas turbine engine as recited in claim 12, wherein the seal seat is a wet seal.

14. The gas turbine engine as recited in claim 13, wherein the ramp extends circumferentially clockwise as the ramp extends radially outward.

15. The gas turbine engine as recited in claim 14, wherein the ramp extends radially outward from an inlet opening at the inner face of the gutter.

16. The gas turbine engine as recited in claim 1, comprising a carbon face seal that abuts the seal seat.

17. The gas turbine engine as recited in claim 1, wherein the ramp extends circumferentially clockwise as the ramp extends radially outward.

18. The gas turbine engine as recited in claim 17, wherein the ramp extends radially outward from an inlet opening at the inner face.

19. The gas turbine engine as recited in claim 1, wherein the ramp extends radially outward from an inlet opening at the inner face.

* * * * *